M. E. VAN LUVEN.
IRRIGATING VESSEL.
APPLICATION FILED NOV. 16, 1910.
1,005,675.
Patented Oct. 10, 1911.
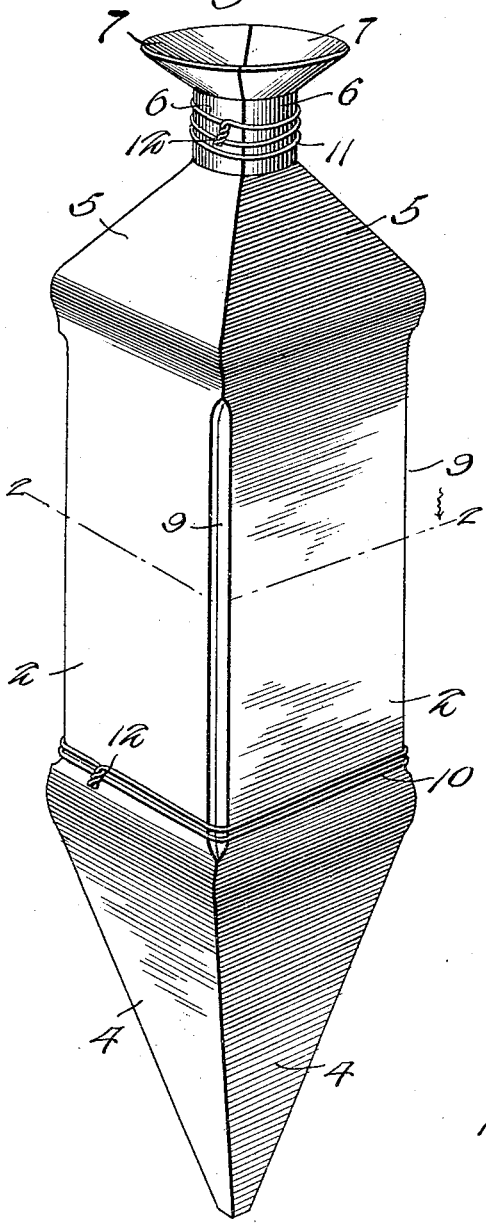
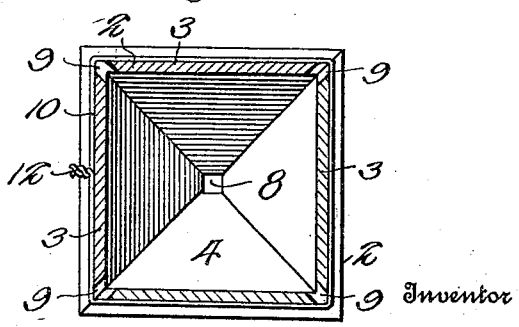
Witnesses
Inventor
Mary E. Van Luven
By Victor J. Evans
Attorney
COLUMBIA PLANOGRAPH CO., WASHINGTON, D. C.

UNITED STATES PATENT OFFICE.

MARY E. VAN LUVEN, OF OAKLAND, CALIFORNIA.

IRRIGATING VESSEL.

1,005,675. Specification of Letters Patent. Patented Oct. 10, 1911.

Application filed November 16, 1910. Serial No. 592,685.

*To all whom it may concern:*

Be it known that I, MARY E. VAN LUVEN, a citizen of the United States of America, residing at Oakland, in the county of Alameda and State of California, have invented new and useful Improvements in Irrigating Vessels, of which the following is a specification.

This invention relates to irrigating vessels and particularly to one designed for the reception of water or a liquid fertilizer, the device being constructed to permit of its being partly embedded in the earth at a point in close proximity with the roots of the tree or plant and being constructed to provide discharge orifices to permit the liquid to flow into the earth and onto the roots.

Another object of the invention is to provide a vessel of this character constructed of separable elements which will permit the vessel when removed to be separated and thoroughly cleaned to avoid clogging of the liquid orifices by roots, leaves or other foreign matter.

In the drawing, forming a portion of this specification and in which like numerals of reference indicate similar parts in the several views:—Figure 1 is a perspective view of my improved irrigating vessel. Fig. 2 is a horizontal section taken on the line 2—2 of Fig. 1.

The invention comprises a receptacle embodying identically formed sections 2, each being provided with intermediate vertical walls 3, downwardly tapered lower walls 4 and upwardly tapered upper walls 5. The construction of the lower walls 4 is such that the receptacle is provided with a relatively sharp pointed lower end to facilitate driving the vessel into the earth should this be desired. If found undesirable to drive the vessel into the earth, a hole conforming in configuration with the vessel may be first formed in the earth and the vessel may then be seated therein. The upper walls 5 of the vessel sections are formed to provide upstanding neck portions 6, each being provided with a mouth portion 7 which portions when assembled form a funnel. The vessel is formed at its lower end with an opening 8 and at the corners the vessel is formed to provide discharge orifices 9.

A binding wire 10 is wrapped about the sections of the vessel adjacent to the lower end thereof and on the neck forming portions 6 of the said vessel sections a similar binding wire 11 is wrapped. These binding wires hold the sections operatively associated with each other. The terminals of the wires are intertwisted, as shown at 12, so as to permit the operator to readily detach the wires from the sections should it be desired to clean the sections or to remove the ingrowing roots from between the walls of the discharge orifices 9.

In practice, the receptacle is driven into the ground, leaving the funnel portion thereof exposed. In the ordinary irrigation of a lawn, water will find its way to the receptacle where it will accumulate and then gradually be discharged by capillary action to moisten the sub-soil. This has been found from experience the most desirable treatment of plants in that the upper surface of the ground will be left dry and loose, thus preventing the evaporation of the moisture, as will be understood.

From experience it has developed that the sun and the wind evaporate a very large percentage of the water when applied to the upper surface of the ground. The method of irrigation herein described will not only be found most beneficial in the cultivation of the plant but it will be found most economical in that a very small quantity of water is required.

I claim:—

An irrigating vessel comprising identically constructed sections, each provided at one end with a tapered portion, the said tapered portions being constructed and arranged to provide a discharge passage at the bottom of the vessel, the said sections having contacting neck portions at their upper ends and provided with funnel forming portions, the said sections having longitudinal passages therein, and binding wires embracing the sections and operating to hold the sections together, each of said wires having intertwisted terminal portions adapted to be disconnected from each other so as to permit removal of the wires and separation of the vessel sections.

In testimony whereof I affix my signature in presence of two witnesses.

MARY E. VAN LUVEN.

Witnesses:
 VIDA M. THORPE,
 E. G. RYKER.

Copies of this patent may be obtained for five cents each, by addressing the "Commissioner of Patents, Washington, D. C."